June 5, 1923.
E. W. MURRAY
LOCK WASHER
Filed May 1, 1920
1,457,592
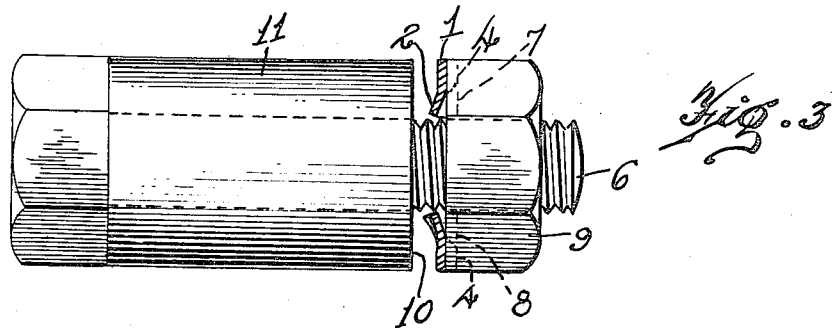
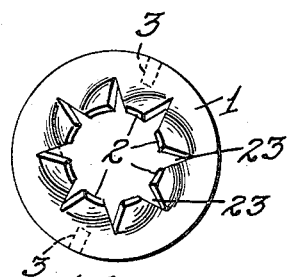
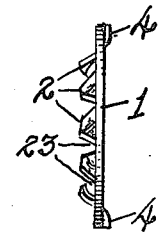
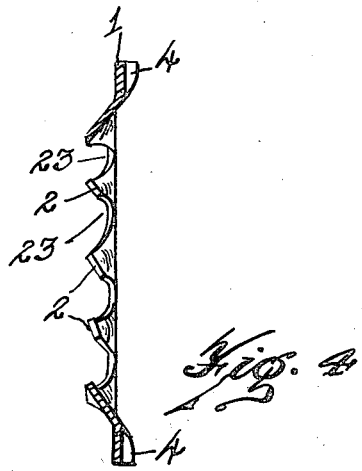
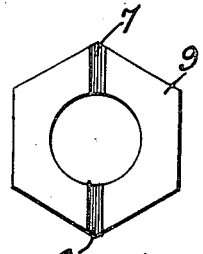
WITNESS:
INVENTOR
EDWARD W. MURRAY.
BY
ATTORNEY Patented June 5, 1923.

1,457,592

UNITED STATES PATENT OFFICE.

EDWARD W. MURRAY, OF DETROIT, MICHIGAN, ASSIGNOR OF FORTY-FIVE ONE-HUNDREDTHS TO JAMES E. BRYANT, OF DETROIT, MICHIGAN.

LOCK WASHER.

Application filed May 1, 1920. Serial No. 378,095.

*To all whom it may concern:*

Be it known that I, EDWARD W. MURRAY, a citizen of the United States, residing at Detroit, county of Wayne, State of Michigan, have invented a certain new and useful Improvement in Lock Washers, and declare the following to be a full, clear, and exact description of the same, such as will enable others skilled in the art to which it pertains to make and use the same, reference being had to the accompanying drawings, which form a part of this specification.

This invention relates to lock washers and the object of the invention is to provide an improvement in the construction of lock washers and to provide a simple, inexpensive and efficient device having great strength and durability, adapted to be readily applied to a nut and capable of positively locking the nut against turning. A further object of the invention is to provide a lock washer of the character described capable of universal application and adapted, should the part to which the lock washer is applied become loose, to enable the nut to be screwed further onto the bolt to tighten the said parts. With the above mentioned objects in view this invention consists of a washer having several internally extending prongs which are turned or twisted at an angle to the plane of the washer to provide a spring tension between the nut and adjacent material and lock the parts together. These objects and the several novel features of the invention are hereinafter more fully described and claimed and the preferred form of construction by which these objects are attained is shown in the accompanying drawings in which—

Fig. 1 is an elevation of a washer showing my preferred form of construction.

Fig. 2 is a side elevation thereof.

Fig. 3 is a section through the washer showing the washer as applied to the bolt.

Fig. 4 is an enlarged section through the washer showing the manner in which the prongs are twisted.

Fig. 5 is a view of the under side of the nut showing the notches adapted to receive the lugs of the washer.

The device, as shown in Fig. 1, consists of a round washer 1 which is stamped out of sheet metal and which is provided with prongs 2 stamped therein by forming several notches 23. These prongs in the stamping process are given a slight twist, as shown in Fig. 4, and at the same time the material is depressed at 3 to provide lugs 4 on the under surface of the washer. As will be noted from Fig. 1, the ends of the prongs 2 are cut off symmetrically in the form of a circle to allow the washer to be slipped over a bolt such as the bolt 6 shown in Fig. 3. The nut with which this washer is used is notched at 7 and 8, as shown in Fig. 5, to receive the lugs 4 of the washer 1, shown more particularly in Fig. 2. The lugs 2 are twisted or turned at an angle to the plane of the washer as shown in Fig. 4, so that upon rotation of the nut 9 and washer onto the bolt 6 the lugs 2 are forced back toward the plane of the washer and upon rotation of the nut off from the bolt the lugs 2 are still further twisted causing the edges thereof to bite into the face 10 of the member 11 and into the threads of the bolt thus preventing removal of the nut.

In operation the washer is first slipped over the bolt 6, as shown in Fig. 3, and the nut 9 is threaded thereon until the lugs 4 engage in the notches 7 and 8 and as shown in dotted lines in Fig. 3. As the nut 9 is turned up on the bolt 6, the edges of the prongs 2 engage the face 10 of the member 11 and as the nut 9 is further turned onto the bolt 6 the twisted prongs 2 are forced back to the plane of the washer thereby forcing the ends of the prongs into the threads of the bolt and the tendency of the prongs to twist forms a tension acting to force the nut 9 away from the face 10 of the member 11 which bindingly engages the nut on the threads of the bolt 6. In order that the ends of the prongs may be forced into the threads of the bolt by the tightening of the nut, as above mentioned, the washer is first punched with an aperture less in diameter than the diameter of the bolt with which it is adapted for use. The prongs are then formed and bent outwardly from the plane of the washer on one side which enlarges the aperture permitting the aperture to be slipped over the bolt and the prongs twisted at an angle to the plane of the washer so that the edges formed by the slitting thereof are positioned to engage and cut into the material against which it is forced by the nut. As will also be understood from the drawings the spring tension produced by the twist of the members 2 tends to force the sharp edges thereof into the face 10 of the member 11 and the adjacent face of the nut 9. On account of this action it can be seen that it is very difficult to unthread the nut 9 from the bolt 6 as such action on the part of the operator would tend to further twist the members 2 which only increases the pressure between the nut 9 and member 11 thereby more tightly securing the nut 9 to the bolt 6. In case the several parts become loosened the nut 9 need be only threaded further onto the bolt 6 thereby tightening the several parts and locking them together.

From the foregoing description it becomes evident that the device, while of a simple nature, is very efficient in operation, of low manufacturing cost, is assembled with ease and accomplishes the objects desired.

Having thus briefly described my invention, its utility and mode of operation, what I claim and desire to secure by Letters Patent of the United States is—

1. In a lock washer, a member formed of sheet metal, lugs provided on one side thereof and a series of prongs bent outwardly on the opposite side and then twisted at an angle to the plane thereof.

2. A lock washer for locking a nut on a bolt comprising a member formed of sheet metal having a central aperture less in diameter than the diameter of the bolt, the material being radially slitted for a distance from the aperture and the material forced outwardly and twisted at an angle to the plane of the washer increasing the diameter of the aperture to greater than the diameter of the bolt, the said prongs by the tightening of the nut having the ends thereof forced to engagement with the threads of the bolt and the edges thereof formed by the slit engaging the face of the material supporting the bolt.

3. A sheet metal lock washer having a central aperture, a series of lugs formed about the aperture by slitting the same on radial lines, the lugs being forced outwardly from the plane of the washer on one side enlarging the aperture and further being twisted relative to the plane of the washer, the nut and washer being constructed so that rotation of the nut in either direction rotates the washer.

4. A lock washer formed of sheet metal and provided with lugs formed on one side thereof, a bolt, a nut therefor notched to receive the said lugs and a plurality of tapered prongs extending outwardly from the plane of the washer and being twisted at an angle thereto, the prongs being returned to the plane of the washer by tightening of the nut, the edges thereof engaging the face of the material in which the bolt is supported and the ends of the prongs engaging the threads of the bolt.

In testimony whereof, I sign this specification.

EDWARD W. MURRAY.